(12) United States Patent
Kumar

(10) Patent No.: US 12,346,916 B2
(45) Date of Patent: Jul. 1, 2025

(54) SALES ORCHESTRATION USING ITERATIVE MACHINE LEARNING

(71) Applicant: Oracle International Corporation, Redwood Shores, CA (US)

(72) Inventor: Vivek Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 18/115,392

(22) Filed: Feb. 28, 2023

(65) Prior Publication Data

US 2024/0289817 A1 Aug. 29, 2024

(51) Int. Cl.
*G06Q 30/02* (2023.01)
*G06Q 30/01* (2023.01)
*G06Q 30/0201* (2023.01)

(52) U.S. Cl.
CPC ......... *G06Q 30/0201* (2013.01); *G06Q 30/01* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 10,489,462 B1 | 11/2019 | Rogynskyy et al. | |
| 10,621,508 B2 | 4/2020 | Kataria et al. | |
| 11,507,967 B1 * | 11/2022 | Shah | G06Q 30/0206 |
| 2008/0109399 A1 | 5/2008 | Liao et al. | |
| 2009/0234710 A1 * | 9/2009 | Belgaied Hassine | G06Q 30/0201 |
| | | | 705/7.29 |
| 2011/0276372 A1 | 11/2011 | Spivack et al. | |
| 2018/0268298 A1 | 9/2018 | Johansen et al. | |
| 2019/0018835 A1 | 1/2019 | Bhowmick et al. | |
| 2020/0027170 A1 | 1/2020 | Archer et al. | |
| 2020/0184016 A1 | 6/2020 | Roller | |
| 2020/0372561 A1 * | 11/2020 | Sanghavi | G06N 5/04 |
| 2022/0245557 A1 * | 8/2022 | Minter | G06N 20/00 |
| 2022/0293107 A1 * | 9/2022 | Leaman | G06F 16/951 |
| 2022/0343250 A1 * | 10/2022 | Tremblay | G06Q 10/0633 |

* cited by examiner

*Primary Examiner* — Kurtis Gills
(74) *Attorney, Agent, or Firm* — Invoke

(57) ABSTRACT

Techniques for sales orchestration using iterative machine learning are disclosed, including: obtaining, by a customer relationship management (CRM) system, opportunity-specific CRM data; generating, by the CRM system, one or more suggested sales actions applicable to the opportunity-specific CRM data, at least by applying a machine learning model to the opportunity-specific CRM data, wherein the machine learning model is configured to generate suggested sales actions based on CRM data; presenting, in a graphical user interface (GUI) of the CRM system, the one or more suggested sales actions; receiving, via the GUI of the CRM system, user input that indicates a chosen sales action associated with the opportunity-specific CRM data; obtaining, by the CRM system, data that indicates an outcome of the chosen sales action; updating the machine learning model based on the outcome of the chosen sales action.

19 Claims, 7 Drawing Sheets

| Process ID | Stage | Action | Score |
|---|---|---|---|
| P1 | Prospecting | Call | 0.84 |
| P2 | Contract | Call | 0.78 |
| P3 | Prospecting | Email | 0.4 |
| P4 | Prospecting | Add decision maker | 0.9 |
| P5 | Negotiation | Call | 0.65 |
| P6 | Negotiation | Send quote | 0.92 |
| P7 | Negotiation | Request discount approval | 0.40 |
| P8 | Discovery | Call | 0.97 |
| P9 | Discovery | Email | 0.88 |
| P10 | Contract | Send for signatures | 0.91 |
| P11 | Prospecting | Add team member | 0.12 |

Output 304

SALES ORCHESTRATION USING ITERATIVE MACHINE LEARNING

TECHNICAL FIELD

The present disclosure relates to sales orchestration. In particular, the present disclosure relates to computer-based sales orchestration using iterative machine learning.

BACKGROUND

A customer relationship management (CRM) system, or CRM for short, is a computer-based system that helps entities (e.g., businesses and other organizations) manage customer interactions and data throughout the customer lifecycle. A typical CRM includes features for storing customer data (e.g., contacts, leads, etc.), tracking customer interactions, and managing customer communication.

Although a CRM is computer-based, its users are humans with varying levels of sales experience and expertise. Sales department leaders may design sales orchestration processes that theoretically adhere to best practices. However, even the most experienced CRM users can struggle to identify the best action to take at a given stage of the opportunity pipeline. The factors that influence sales outcomes may be latent and/or indiscernible to human users in practice. For example, an action associated with a high probability of success in one situation may be associated with a low probability of success in another situation, even though the two situations appear facially very similar to a human user. Thus, relying on human expertise alone is generally insufficient to ensure that the highest-probability sales action is identified and pursued in any specific instance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

Figure 1:
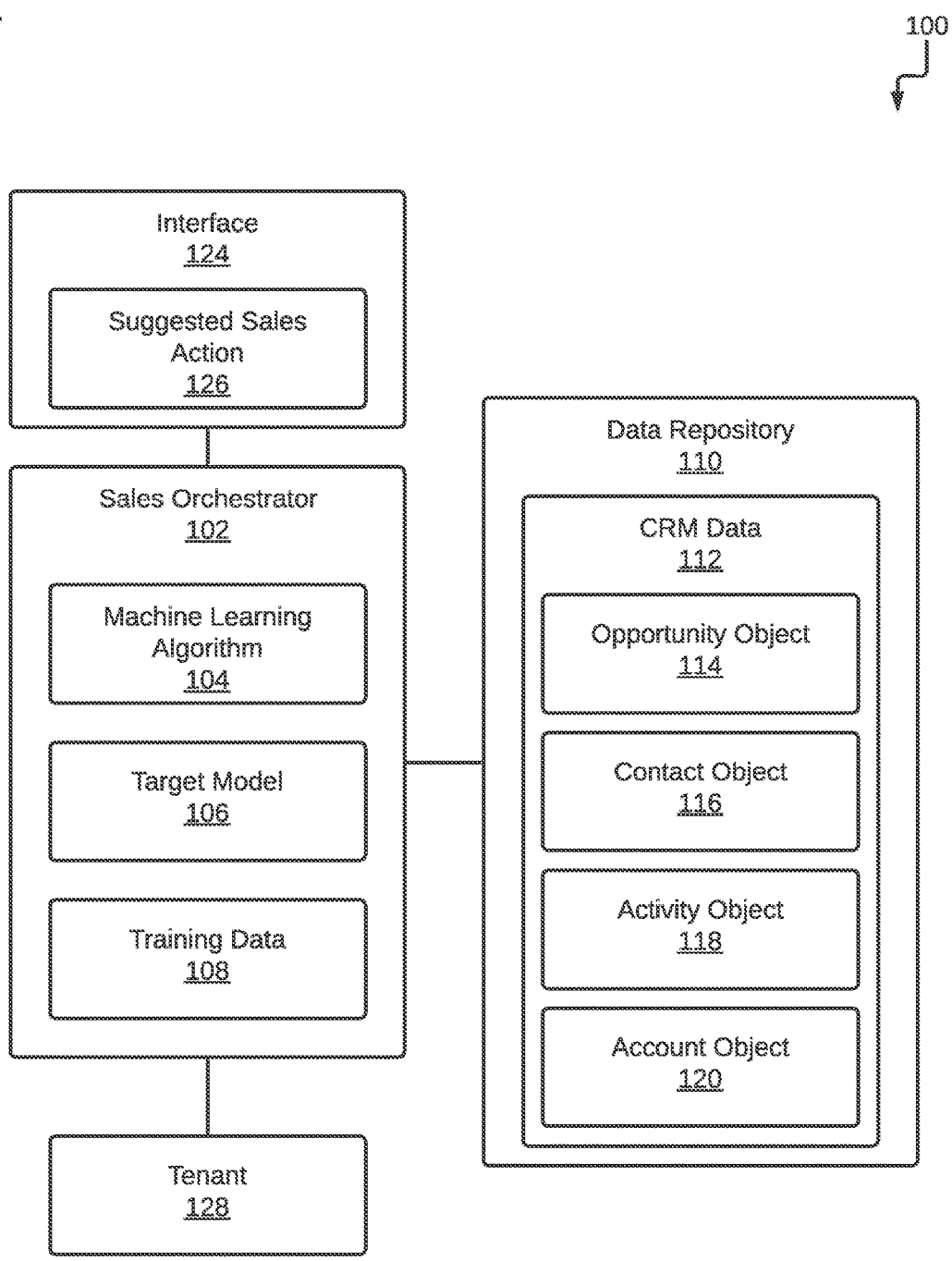
FIG. 1 shows a block diagram that illustrates an example of a system in accordance with one or more embodiments.

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.
1. GENERAL OVERVIEW
2. EXAMPLE SYSTEM
   2.1. SYSTEM COMPONENTS
   2.2. DATA STORAGE
   2.3. USER INTERFACE
   2.4. TENANTS
   2.5. MACHINE LEARNING
3. SALES ORCHESTRATION USING ITERATIVE MACHINE LEARNING
4. EXAMPLE EMBODIMENT
5. GRAPHICAL USER INTERFACE
6. COMPUTER NETWORKS AND CLOUD NETWORKS
7. MICROSERVICE APPLICATIONS
   7.1. TRIGGERS
   7.2. ACTIONS
8. HARDWARE OVERVIEW
9. MISCELLANEOUS; EXTENSIONS

1. GENERAL OVERVIEW

One or more embodiments use iterative machine learning techniques to orchestrate a CRM-based sales process. Specifically, one or more embodiments use machine learning to generate suggested sales actions for a given set of opportunity-specific CRM data. One or more embodiments present the suggested sales actions in a graphical user interface (GUI) of the CRM. When a CRM user takes an action-which in some cases may not be one of the suggested sales actions—the outcome of the chosen action feeds back into the machine learning process, to further improve future suggestions. The suggested sales actions may be associated with priority scores, which may correspond to predicted likelihoods of success (e.g., the likelihood of progressing to the next stage in the opportunity pipeline). One or more embodiments present suggested sales actions in order of their respective priority scores and may filter out suggested sales actions whose priority scores fail to satisfy a threshold condition (e.g., that fall below a minimum value). In some cases, a user may attempt to choose an action that is not the top-priority suggested sales action and/or not one of the suggested sales actions at all. One or more embodiments enforce permissions that determine whether a given user is allowed to choose an action that is (a) not the top-priority suggestion and/or (b) not one of the suggested sales actions at all.

Using machine learning allows the CRM to generate suggested sales actions that draw from a large set of data, which may be larger than any individual CRM user is capable of learning and analyzing. In addition, machine learning may identify patterns and trends that are latent and/or indiscernible to human users in practice. For example, one or more embodiments may suggest an action associated with a high probability of success, even though the same action would be associated with a lower probability of success in another situation that is facially very similar. The CRM continues to learn from the outcomes of all user actions—not just the actions of a single CRM user-thus improving the system's ability to generate high-probability suggestions over time. Because the improvements are driven by machine learning and collective CRM data, these improvements can occur at a rate that is much faster than any given user's ability to learn.

One or more embodiments described in this Specification and/or recited in the claims may not be included in this General Overview section.

2. EXAMPLE SYSTEM

2.1. System Components

FIG. 1 illustrates an example of a system 100 in accordance with one or more embodiments. The system 100 may be a customer relationship management (CRM) system. As illustrated in FIG. 1, the system 100 includes a sales orchestrator 102, a data repository 110, one or more tenants 128, and an interface 124. The sales orchestrator 102 includes a machine learning algorithm 104, a target model 106, and training data 108. The data repository 110 includes CRM data 112, which includes one or more opportunity objects 114, one or more contact objects 116, one or more activity objects 118, and one or more account objects 120. The interface 124 is configured to present one or more suggested sales actions 126. Each of these components is described in further detail below.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a sales orchestrator 102 refers to hardware and/or software configured to perform operations for sales orchestration using iterative machine learning, examples of which are described below. Specifically, the sales orchestrator 102 is configured to use a machine learning algorithm 104 to train a target model 106, based on training data 108. Some examples of machine learning techniques are described in further detail below. The sales orchestrator 102 and/or other components illustrated in FIG. 1 may be part(s) of a CRM system. Alternatively, the sales orchestrator 102 may operate as a separate service that operates using data obtained from a CRM system.

In an embodiment, the sales orchestrator 102 is configured to use CRM data 112 stored in a data repository 110. The CRM data 112 may include historical data and/or current data, where current data is associated with current sales opportunities that are still open. The sales orchestrator 102 may use, as training data 108, historical CRM data 112 that describes the outcomes of specific sales actions. Thus, the machine learning algorithm 104 can learn from the outcomes prior sales efforts.

In an embodiment, CRM data 112 includes one or more of the following:
 1. One or more opportunity objects 114. An opportunity object 114 stores information about a given sales opportunity such as name, stage, amount, win probability, expected close date and/or other kinds of opportunity-related data. Some examples of opportunity objects 114 are described in further detail below.
 2. One or more contact objects 116. A contact object 116 stores information about a person who represents a business in the business-to-business (B2B) context.
 3. One or more activity objects 118. An activity object 118 tracks activities that are performed by one or more sales representatives in their efforts to move an opportunity from one stage to the next, until the opportunity is closed due to win or loss. Some examples of activity objects 118 are described in further detail below.
 4. One or more account objects 120. An account object 120 stores information about a business to which a particular contact (represented by a corresponding contact object 116) belongs.

In an embodiment, training data 108 includes both opportunity objects 114 and associated activity objects 118.

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

In one or more embodiments, a data repository 110 is any type of storage unit and/or device (e.g., a file system, database, collection of tables, and/or any other storage mechanism) for storing data. As illustrated in FIG. 1, the data repository 110 may be configured to store CRM data 112. The data repository 110 may include multiple different storage units and/or devices. The multiple different storage units and/or devices may or may not be of the same type or located at the same physical site. The data repository 110 may be implemented or executed on the same computing system as the sales orchestrator 102, and/or on a computing system separate from the sales orchestrator 102. The data repository 110 may be communicatively coupled to the sales orchestrator 102 via a direct connection or via a network. Information describing CRM data 112 may be implemented across any of the components of the system 100. However, this information is illustrated within the data repository 110 for purposes of clarity and explanation.

2.3. User Interface

In one or more embodiments, an interface 124 refers to hardware and/or software configured to facilitate communications between a user and the sales orchestrator 102. Specifically, the interface 124 is configured to present one or more suggested sales actions 126. The interface 124 may also be configured to receive user input that indicates a chosen sales action. An example of an interface 124 is described in further detail below.

The interface 124 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 124 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 124 may be specified in one or more other languages, such as Java, Python, C, or C++.

2.4. Tenants

In one or more embodiments, a tenant 128 is a corporation, organization, enterprise, or other entity that accesses a shared computing resource, such as the sales orchestrator 102. The system 100 may include multiple tenants 128 that are independent from each other, such that a business or operation of one tenant is separate from a business or operation of another tenant. Some examples of multi-tenant architectures in accordance with one or more embodiments are described in further detail below.

2.5. Machine Learning

In one or more embodiments, a machine learning algorithm 104 is an algorithm that can be iterated to learn a target model 106 that best maps a set of input variables to one or more output variables, using a set of training data 108. The training data 108 includes datasets and associated labels. The datasets are associated with input variables for the target model 106. The associated labels are associated with the output variable(s) of the target model 106. For example, the training data 108 may include opportunity objects 114 and associated activity objects 118. For each opportunity, these objects may indicate corresponding opportunity stages, activity types, and activity outcomes. The machine learning algorithm 104 may use the activity outcomes as labels that indicate the outcomes of specific actions taken with respect to each opportunity. The training data 108 may be updated based on, for example, feedback on the accuracy of the current target model 106. Updated training data may be fed back into the machine learning algorithm 104, which may in turn update the target model 106.

The machine learning algorithm 104 may generate the target model 106 such that the target model 106 best fits the datasets of the training data 108 to the labels of the training data 108. Specifically, the machine learning algorithm 104 may generate the target model 106 such that when the target model 106 is applied to the datasets of the training data 108, a maximum number of results determined by the target model 106 match the labels of the training data 108. Different target models may be generated based on different machine learning algorithms and/or different sets of training data.

The machine learning algorithm 104 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

3. SALES ORCHESTRATION USING ITERATIVE MACHINE LEARNING

Figure 2A:
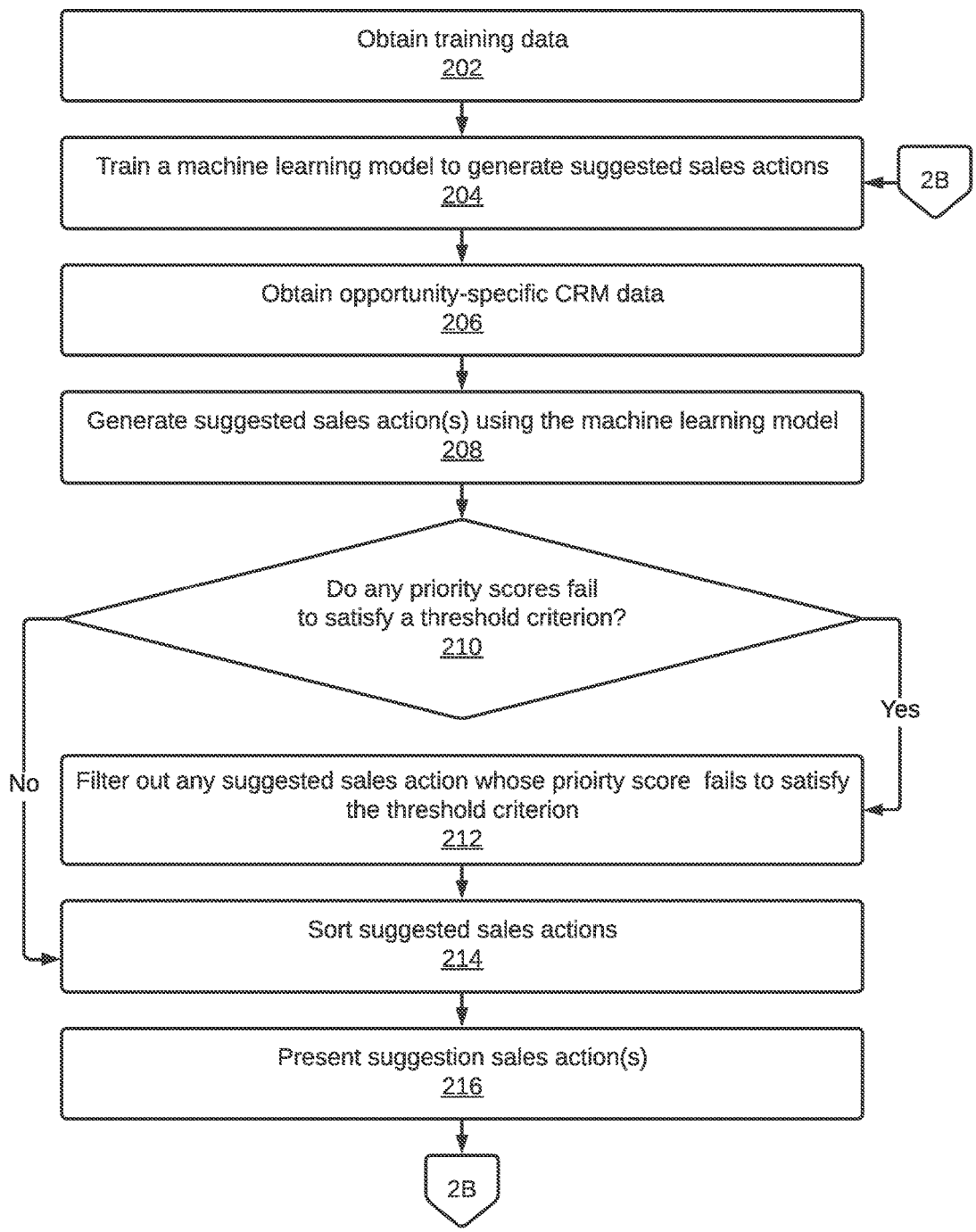
FIGS. 2A-2B illustrate an example set of operations for sales orchestration using iterative machine learning in accordance with one or more embodiments.
Figure 2B:
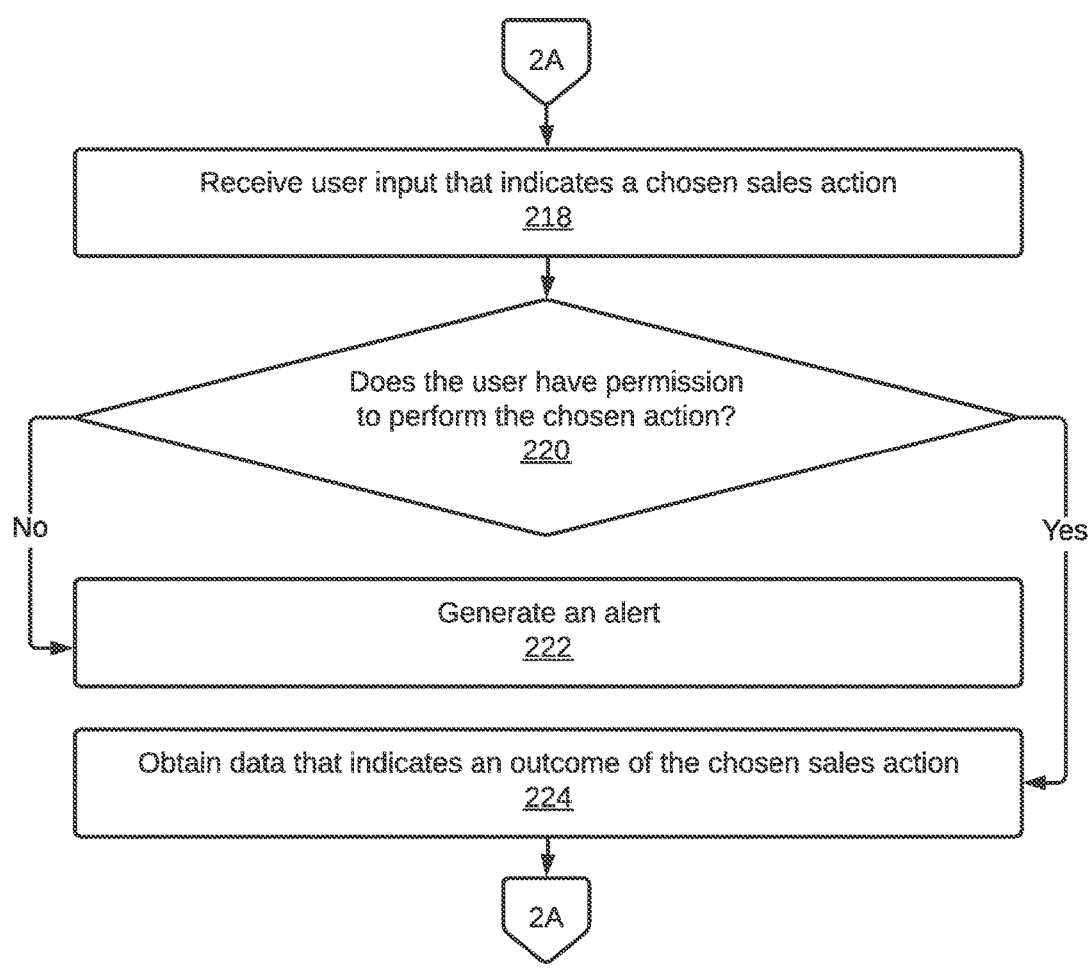

FIGS. 2A-2B illustrate an example set of operations for sales orchestration using iterative machine learning in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments. In the following discussion, the term "system" may refer to one or more components of the system 100 illustrated in FIG. 1, such as the sales orchestrator 102.

In an embodiment, the system obtains training data (Operation 202). Based on the training data, the system may train a machine learning model to generate suggested sales actions (Operation 204). As described herein, each suggested sales action may be associated with a corresponding priority score, which indicates the likelihood of a positive outcome of taking that action. A suggested sales action with a higher priority score may have a greater likelihood of success than one with a lower priority score. Alternatively or additionally, another ranking system may be used.

To apply the machine learning model in a "live" setting, the system may obtain opportunity-specific CRM data (Operation 206). As with the training process, opportunity-specific CRM data may include information that describes the current opportunity stage, activities already taken (if any), and outcomes of those activities.

The system may generate one or more suggested sales actions, using the machine learning model (Operation 208). Specifically, the system may apply the machine learning model to the opportunity-specific CRM data. Based on the opportunity-specific CRM data, the machine learning model may generate a set of suggested sales actions and associated priority scores.

In an embodiment, the system determines whether any of the priority scores associated with the suggested sales actions fail to satisfy a threshold criterion (Operation 210). For example, the system may determine whether the value of a particular priority score is at least a minimum value. The threshold criterion may be predetermined and/or user-configurable. For example, an administrator may be able to adjust the threshold criterion to enforce more or less rigorous sales orchestration. The system may filter out any out suggested sales action whose corresponding priority score fails to satisfy the threshold criterion (Operation 212).

In an embodiment, the system is configured to present suggested sales actions in order of priority score, from highest to lowest. Accordingly, the system may sort the suggested sales actions (Operation 214) according to their respective priority scores. The system may present the suggested sales action(s) to a user (Operation 216). In an embodiment, the system presents the suggested sales action(s) in a graphical user interface (GUI) and/or another kind of interface. An example of a GUI is described in further detail below.

In an embodiment, the system receives user input that indicates a chosen sales action (Operation 218). In some cases, the action(s) that a user can choose may depend on one or more permissions assigned to that user. Some users may only be able to choose the highest-priority suggested sales action presented to them. Some users may be able to choose a suggested sales action that does not have the highest priority score. Some users may be able to choose a suggested action that is not one of the suggested sales actions at all. Responsive to receiving user input the system may determine whether the user has permission to perform the chosen action (Operation 220).

If the user does not have permission to perform the chosen action, the system may generate an alert (Operation 222). The system may present the alert in the interface, transmit the alert to an administrator, log the alert, and/or take some other kind of action with respect to the alert. When an alert is raised, the system may prohibit the user from choosing that particular action. If the user does have permission to perform the chosen action (or in cases where permissions do not apply), the system may store information that describes the chosen action, for example, in an associated activity object.

After a user chooses a particular sales action, the system may subsequently obtain data that indicates an outcome of the chosen sales action (Operation 224). The system may use the outcome data in an iterative process to update the machine learning model. Specifically, the system may perform additional training of the machine learning model (Operation 204), so that the machine learning model learns from sales activity outcomes on an ongoing basis. For example, if users tend to choose the primary action suggested, the suggested orchestration process may remain the same. If users choose secondary actions and they are successful, the suggested orchestration process may change over time so that the secondary actions rise in priority. If users choose actions that are not among the suggested actions, the system may add those actions to the set of available actions with corresponding priority scores based on their demonstrated outcomes. A threshold criterion, as described above, may help avoid overwhelming users with an excessive number of such ad hoc options.

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
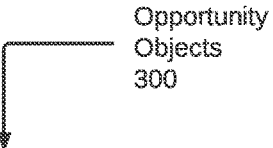
FIGS. 3A-3C illustrate examples of opportunity objects, activity objects, and machine learning output in accordance with one or more embodiments.

FIG. 3A illustrates an example of opportunity objects 300 in accordance with one or more embodiments. In this example, each row corresponds to a separate opportunity object 300. The Opportunity ID is a unique identifier associated with each opportunity; the remaining fields describe various attributes of each opportunity: name; account; opportunity stage; expected close data; win probability; and dollar value (amount) of the opportunity.

Figure 3B:
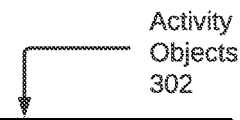

FIG. 3B illustrates an example of activity objects 302 in accordance with one or more embodiments. In this example, each row corresponds to a separate activity object 302, which represents an activity performed with respect to a particular opportunity. The Activity ID is a unique identifier associated with the particular activity. The opportunity in question is identified by the Opportunity ID, which maps back to the corresponding opportunity object 300.

Figure 3C:
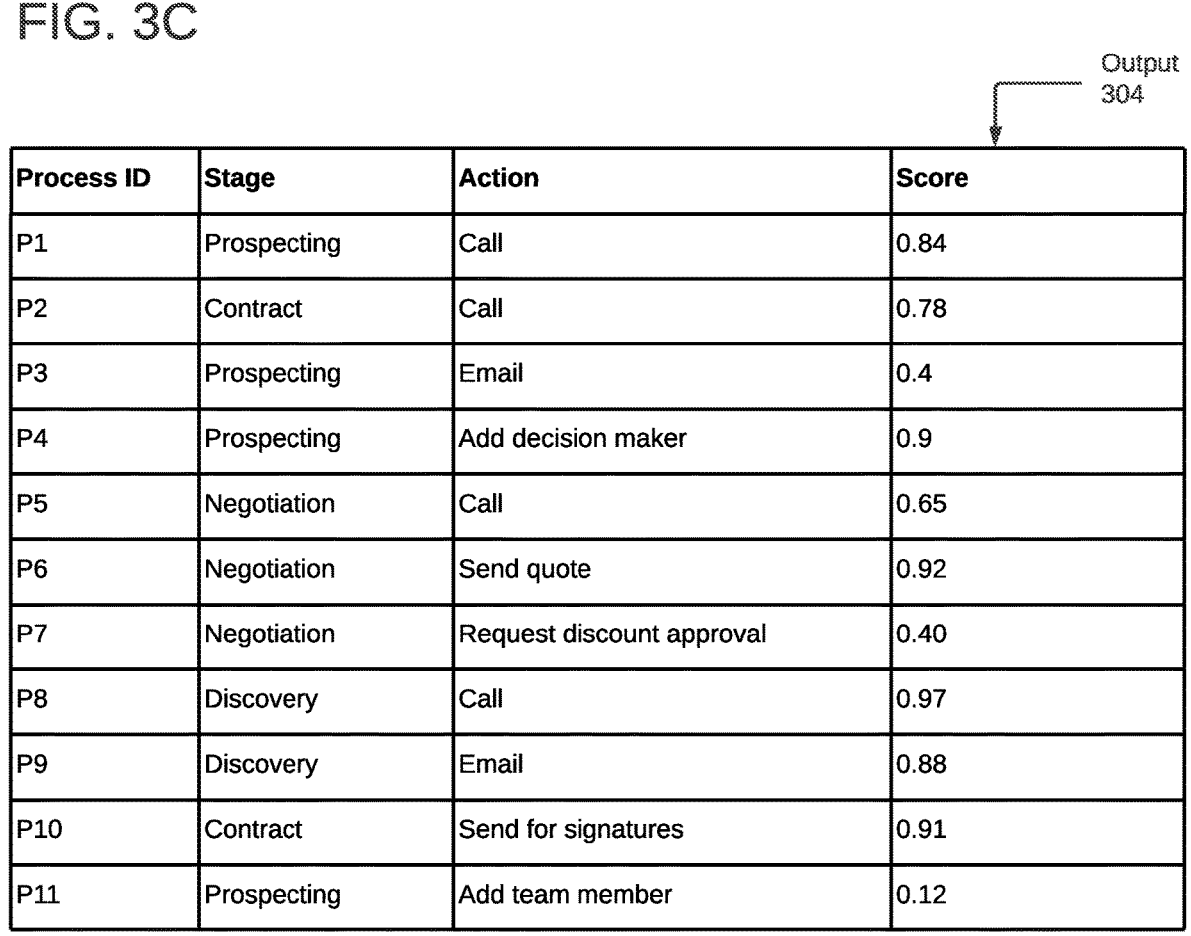

FIG. 3C illustrates an example of the output 304 of a machine learning model, in accordance with one or more embodiments. Specifically, the output 304 is generated by applying the machine learning model to a set of opportunity-specific data, In this example, the process ID is a unique system-generated identifier that uniquely identifies each suggested sales action within a given set of suggested sales actions. The stage is the current stage of the sales opportunity. The action is a suggested action that a sales representative might choose to perform. The score is the priority score, i.e., the likelihood of a positive outcome from choosing that action. The system may filter and present the output 304 in a graphical user interface (GUI). An example of a GUI is described in further detail below.

5. GRAPHICAL USER INTERFACE

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
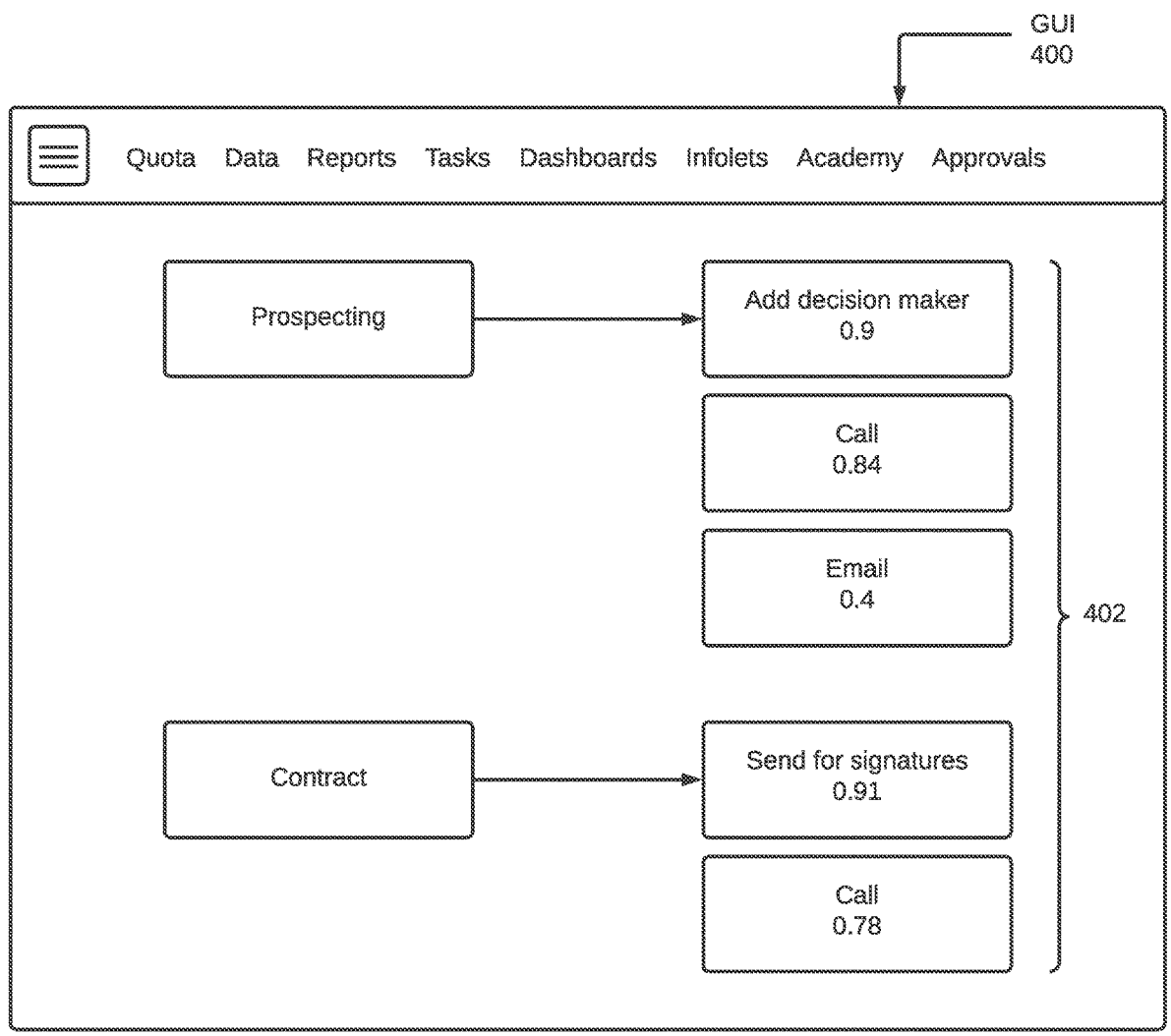
FIG. 4 illustrates an example of a graphical user interface in accordance with one or more embodiments.

Specifically, FIG. 4 illustrates an example of a graphical user interface (GUI) 400 in accordance with one or more embodiments. Specifically, the GUI 400 in this example includes a visual orchestration diagram. The suggested sales actions 402 are presented in order of their respective priority scores. In FIG. 4, the priority scores are shown for ease of discussion; in one or more embodiments, the scores themselves may be omitted from the GUI 400. The topmost suggestion 402 is the main action recommended to the user (i.e., the sales representative); the lower suggestions 402 are secondary actions. As discussed herein, some users may only have permission to choose the main action, and/or some users may be able to choose actions that are not listed in the suggested sales actions 402. In this example, there is a threshold criterion that requires a priority score of at least 0.3. Accordingly, any machine learning output having a lower priority score (e.g., P11 in FIG. 3C) is not presented in the GUI 400.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MICROSERVICE APPLICATIONS

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

7.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

7.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. HARDWARE OVERVIEW

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 5:
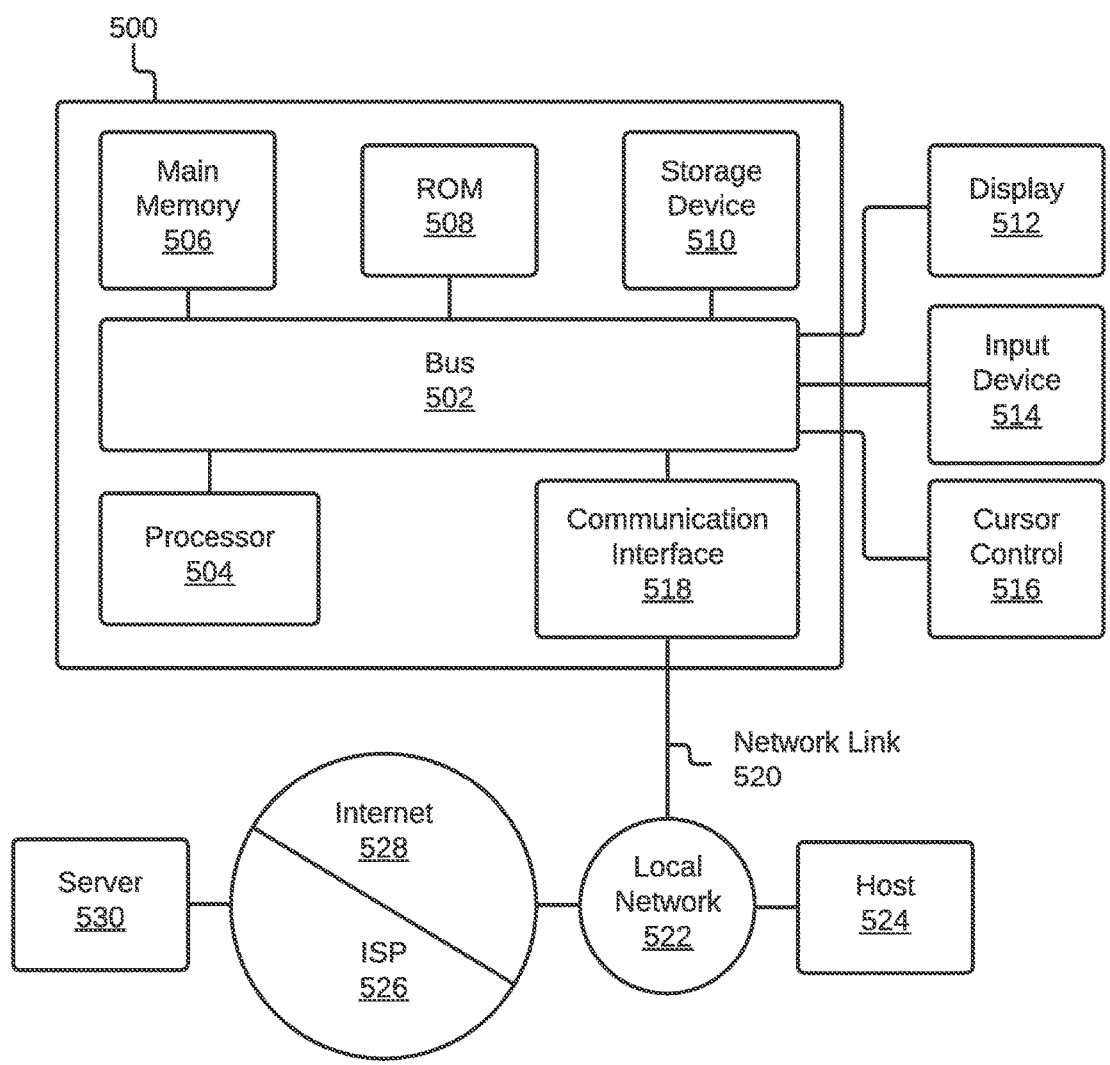
FIG. 5 shows a block diagram that illustrates a computer system in accordance with one or more embodiments.

For example, FIG. 5 is a block diagram that illustrates a computer system 500 upon which one or more embodiments of the invention may be implemented. The computer system 500 includes a bus 502 or other communication mechanism for communicating information, and a hardware processor 504 coupled with bus 502 for processing information. The hardware processor 504 may be, for example, a general-purpose microprocessor.

The computer system 500 also includes a main memory 506, such as a random access memory (RAM) or other dynamic storage device, coupled to bus 502 for storing information and instructions to be executed by processor 504. The main memory 506 also may be used for storing temporary variables or other intermediate information during execution of instructions to be executed by processor 504. Such instructions, when stored in non-transitory storage media accessible to the processor 504, render the computer system 500 into a special-purpose machine that is customized to perform the operations specified in the instructions.

The computer system 500 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions.

The computer system 500 may be coupled via the bus 502 to a display 512, such as a cathode ray tube (CRT), for displaying information to a computer user. An input device 514, including alphanumeric and other keys, is coupled to the bus 502 for communicating information and command selections to the processor 504. Another type of user input device is cursor control 516, such as a mouse, a trackball, or cursor direction keys for communicating direction information and command selections to the processor 504 and for controlling cursor movement on the display 512. This input device typically has two degrees of freedom in two axes, a first axis (e.g., x) and a second axis (e.g., y), that allows the device to specify positions in a plane.

The computer system 500 may implement techniques described herein using customized hard-wired logic, one or more ASICs or FPGAs, firmware, and/or program logic which in combination with the computer system 500 causes or programs the computer system 500 to be a special-purpose machine. In one or more embodiments, the techniques herein are performed by the computer system 500 in response to the processor 504 executing one or more sequences of one or more instructions contained in the main memory 506. Such instructions may be read into the main memory 506 from another storage medium, such as the storage device 510. Execution of the sequences of instructions contained in the main memory 506 causes the processor 504 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 510. Volatile media includes dynamic memory, such as the main memory 506. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 502. Transmission media can also take the form of acoustic or light waves, such as those generated during radio frequency (RF) and infrared data communications.

Various forms of media may be involved in carrying one or more sequences of one or more instructions to the processor 504 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 500 can receive the data on the telephone line or other communications medium and use an infrared transmitter to convert the data to an infrared signal. An infrared detector can receive the data carried in the infrared signal and appropriate circuitry can place the data on the bus 502. The bus 502 carries the data to the main memory 506, from which the processor 504 retrieves and executes the instructions. The instructions received by the main memory 506 may optionally be stored on the storage device 510, either before or after execution by processor 504.

The computer system 500 also includes a communication interface 518 coupled to the bus 502. The communication interface 518 provides a two-way data communication coupling to a network link 520 that is connected to a local network 522. For example, the communication interface 518 may be an integrated services digital network (ISDN) card, cable modem, satellite modem, or a modem to provide a data communication connection to a corresponding type of telephone line. As another example, the communication interface 518 may be a local area network (LAN) card configured to provide a data communication connection to a compatible LAN. Wireless links may also be implemented. In any such implementation, the communication interface 518 sends and receives electrical, electromagnetic, or optical signals that carry digital data streams representing various types of information.

The network link 520 typically provides data communication through one or more networks to other data devices. For example, the network link 520 may provide a connection through a local network 522 to a host computer 524 or to data equipment operated by an Internet Service Provider (ISP) 526. The ISP 526 in turn provides data communication services through the world wide packet data communication network now commonly referred to as the "Internet" 528. The local network 522 and Internet 528 both use electrical, electromagnetic, or optical signals that carry digital data streams. The signals through the various networks and the signals on the network link 520 and through the communication interface 518, which carry the digital data to and from the computer system 500, are example forms of transmission media.

The computer system 500 can send messages and receive data, including program code, through the network(s), network link 520, and communication interface 518. In the Internet example, a server 530 might transmit a requested code for an application program through the Internet 528, ISP 526, local network 522, and communication interface 518.

The received code may be executed by processor 504 as it is received, and/or may be stored in the storage device 510 or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions that, when executed by one or more processors, cause performance of operations comprising:
    training a machine learning model to generate suggested sales actions based on customer relationship management (CRM) data,
        wherein training the machine learning model is performed using historical CRM data comprising (a) a plurality of opportunity objects that store information respectively about a plurality of historical sales opportunities and (b) a plurality of activity objects that store information about activities performed by sales representatives with respect to the plurality of historical sales opportunities;
        wherein for a particular historical sales opportunity in the plurality of historical sales opportunities, the historical CRM data comprises an opportunity object, in the plurality of opportunity objects, comprising (a) a first unique identifier associated with the opportunity object and (b) one or more fields describing one or more respective attributes of the particular historical sales opportunity;
    obtaining, by a customer relationship management (CRM) system, a first set of opportunity-specific CRM data associated with a first sales opportunity;
    generating, by the CRM system, a first set of one or more suggested sales actions applicable to the first set of opportunity-specific CRM data, at least by:
        applying the machine learning model to the first set of opportunity-specific CRM data;
    obtaining, from the machine learning model, a first set of one or more priority scores that are associated with respective suggested sales actions in the first set of one or more suggested sales actions;
    presenting, in a graphical user interface (GUI) of the CRM system, the first set of one or more suggested sales actions, along with an indication of a first highest-ranked suggested sales action based on the first set of one or more priority scores;
    receiving, via the GUI of the CRM system, first user input that indicates a first chosen sales action associated with the first set of opportunity-specific CRM data, wherein the first chosen sales action is not the first highest-ranked suggested sales action;
    obtaining, by the CRM system, data that indicates an outcome of the first chosen sales action;
    updating the machine learning model based on the outcome of the first chosen sales action, such that reapplying the retrained machine learning model to the first set of opportunity-specific CRM data would result in the first chosen sales action being associated with a higher priority score than the first highest-ranked suggested sales action.

2. The one or more non-transitory computer-readable media of claim 1, the operations further comprising:
    obtaining, by the CRM system, a second set of opportunity-specific CRM data;
    generating, by the CRM system, a second set of one or more suggested sales actions applicable to the second set of opportunity-specific CRM data, at least by:
        applying the machine learning model to the second set of opportunity-specific CRM data;
    presenting, in the GUI of the CRM system, the second set of one or more suggested sales actions;
    wherein the second set of one or more suggested sales actions is different, in at least one respect, than if the machine learning model had been applied to the second set of opportunity-specific CRM data before updating the machine learning model based on the outcome of the first chosen sales action.

3. The one or more non-transitory computer-readable media of claim 1, the operations further comprising:
    before presenting the one or more suggested sales actions:
        determining that a priority score associated with a particular suggested sales action in the set of suggested sales actions fails to satisfy a threshold criterion;
        responsive to determining that the priority score fails to satisfy the threshold criterion: filtering out the particular suggested sales action from the first set of one or more suggested sales actions.

4. The one or more non-transitory computer-readable media of claim 1, wherein the first chosen sales action is a user-initiated action that is not in the first set of one or more suggested sales actions, the operations further comprising:
    determining, by the CRM system, that a user who supplied the first user input has permission to perform user-initiated actions that are not in the first set of one or more suggested sales actions.

5. The one or more non-transitory computer-readable media of claim 1, the operations further comprising:
  determining, by the CRM system, that a user who supplied the first user input has permission to perform sales actions that are not highest-ranked in the first set of one or more suggested sales actions.

6. A system comprising:
  at least one device comprising one or more hardware processors,
  the system being configured to perform operations comprising:
  training a machine learning model to generate suggested sales actions based on customer relationship management (CRM) data,
    wherein training the machine learning model is performed using historical CRM data comprising (a) a plurality of opportunity objects that store information respectively about a plurality of historical sales opportunities and (b) a plurality of activity objects that store information about activities performed by sales representatives with respect to the plurality of historical sales opportunities;
    wherein for a particular historical sales opportunity in the plurality of historical sales opportunities, the historical CRM data comprises an opportunity object, in the plurality of opportunity objects, comprising (a) a first unique identifier associated with the opportunity object and (b) one or more fields describing one or more respective attributes of the particular historical sales opportunity;
  obtaining, by a customer relationship management (CRM) system, a first set of opportunity-specific CRM data associated with a first sales opportunity;
  generating, by the CRM system, a first set of one or more suggested sales actions applicable to the first set of opportunity-specific CRM data, at least by:
    applying the machine learning model to the first set of opportunity-specific CRM data;
  obtaining, from the machine learning model, a first set of one or more priority scores that are associated with respective suggested sales actions in the first set of one or more suggested sales actions;
  presenting, in a graphical user interface (GUI) of the CRM system, the first set of one or more suggested sales actions, along with an indication of a first highest-ranked suggested sales action based on the first set of one or more priority scores;
  receiving, via the GUI of the CRM system, first user input that indicates a first chosen sales action associated with the first set of opportunity-specific CRM data, wherein the first chosen sales action is not the first highest-ranked suggested sales action;
  obtaining, by the CRM system, data that indicates an outcome of the first chosen sales action;
    updating the machine learning model based on the outcome of the first chosen sales action, such that reapplying the retrained machine learning model to the first set of opportunity-specific CRM data would result in the first chosen sales action being associated with a higher priority score than the first highest-ranked suggested sales action.

7. The system of claim 6, the operations further comprising:
  obtaining, by the CRM system, a second set of opportunity-specific CRM data;
  generating, by the CRM system, a second set of one or more suggested sales actions applicable to the second set of opportunity-specific CRM data, at least by:
    applying the machine learning model to the second set of opportunity-specific CRM data;
  presenting, in the GUI of the CRM system, the second set of one or more suggested sales actions;
  wherein the second set of one or more suggested sales actions is different, in at least one respect, than if the machine learning model had been applied to the second set of opportunity-specific CRM data before updating the machine learning model based on the outcome of the first chosen sales action.

8. The system of claim 6, the operations further comprising:
  before presenting the one or more suggested sales actions:
    determining that a priority score associated with a particular suggested sales action in the set of suggested sales actions fails to satisfy a threshold criterion;
  responsive to determining that the priority score fails to satisfy the threshold criterion: filtering out the particular suggested sales action from the first set of one or more suggested sales actions.

9. The system of claim 6, wherein the first chosen sales action is a user-initiated action that is not in the first set of one or more suggested sales actions, the operations further comprising:
  determining, by the CRM system, that a user who supplied the first user input has permission to perform user-initiated actions that are not in the first set of one or more suggested sales actions.

10. The one or more non-transitory computer-readable media of claim 1, the operations further comprising:
  determining, by the CRM system, that a user who supplied the first user input has permission to perform sales actions that are not highest-ranked in the first set of one or more suggested sales actions.

11. A method comprising:
  training a machine learning model to generate suggested sales actions based on customer relationship management (CRM) data,
    wherein training the machine learning model is performed using historical CRM data comprising (a) a plurality of opportunity objects that store information respectively about a plurality of historical sales opportunities and (b) a plurality of activity objects that store information about activities performed by sales representatives with respect to the plurality of historical sales opportunities;
    wherein for a particular historical sales opportunity in the plurality of historical sales opportunities, the historical CRM data comprises an opportunity object, in the plurality of opportunity objects, comprising (a) a first unique identifier associated with the opportunity object and (b) one or more fields describing one or more respective attributes of the particular historical sales opportunity;
  obtaining, by a customer relationship management (CRM) system, a first set of opportunity-specific CRM data associated with a first sales opportunity;
  generating, by the CRM system, a first set of one or more suggested sales actions applicable to the first set of opportunity-specific CRM data, at least by:
    applying the machine learning model to the first set of opportunity-specific CRM data;
  obtaining, from the machine learning model, a first set of one or more priority scores that are associated with respective suggested sales actions in the first set of one or more suggested sales actions;

presenting, in a graphical user interface (GUI) of the CRM system, the first set of one or more suggested sales actions, along with an indication of a first highest-ranked suggested sales action based on the first set of one or more priority scores;

receiving, via the GUI of the CRM system, first user input that indicates a first chosen sales action associated with the first set of opportunity-specific CRM data, wherein the first chosen sales action is not the first highest-ranked suggested sales action;

obtaining, by the CRM system, data that indicates an outcome of the first chosen sales action;

updating the machine learning model based on the outcome of the first chosen sales action, such that reapplying the retrained machine learning model to the first set of opportunity-specific CRM data would result in the first chosen sales action being associated with a higher priority score than the first highest-ranked suggested sales action;

wherein the method is performed by at least device comprising one or more hardware processors.

12. The method of claim 11, further comprising:
obtaining, by the CRM system, a second set of opportunity-specific CRM data;
generating, by the CRM system, a second set of one or more suggested sales actions applicable to the second set of opportunity-specific CRM data, at least by:
applying the machine learning model to the second set of opportunity-specific CRM data;
presenting, in the GUI of the CRM system, the second set of one or more suggested sales actions;
wherein the second set of one or more suggested sales actions is different, in at least one respect, than if the machine learning model had been applied to the second set of opportunity-specific CRM data before updating the machine learning model based on the outcome of the first chosen sales action.

13. The method of claim 11, further comprising:
before presenting the one or more suggested sales actions:
determining that a priority score associated with a particular suggested sales action in the set of suggested sales actions fails to satisfy a threshold criterion;
responsive to determining that the priority score fails to satisfy the threshold criterion: filtering out the particular suggested sales action from the first set of one or more suggested sales actions.

14. The method of claim 11, wherein the first chosen sales action is a user-initiated action that is not in the first set of one or more suggested sales actions, the method further comprising:
determining, by the CRM system, that a user who supplied the first user input has permission to perform user-initiated actions that are not in the first set of one or more suggested sales actions.

15. The method of claim 11, the method further comprising:
determining, by the CRM system, that a user who supplied the first user input has permission to perform sales actions that are not highest-ranked in the first set of one or more suggested sales actions.

16. The one or more non-transitory computer-readable media of claim 1, wherein the historical CRM data further comprises, for the particular historical sales opportunity in the plurality of historical sales opportunities:
an activity object, in the plurality of activity objects, comprising (a) the first unique identifier associated with the opportunity object, (b) a second unique identifier associated with the activity object, and (c) one or more fields describing one or more respective attributes of an activity represented by the activity object;
wherein the first unique identifier of the activity object maps to the opportunity object.

17. The one or more non-transitory computer-readable media of claim 1, wherein the machine learning model is configured to generate output comprising:
a unique identifier that is associated with a particular suggested sales action in the first set of one or more suggested sales actions applicable to the first set of opportunity-specific CRM data; and
a particular priority score, in the first set of one or more priority scores, that is associated with the particular suggested sales action.

18. The one or more non-transitory computer-readable media of claim 1, wherein a particular priority score in the first set of one or more priority scores indicates, for a particular suggested sales action in the first set of one or more suggested sales actions, a predicted likelihood of the particular suggested sales action causing the first sales opportunity to progress to a next stage.

19. The one or more non-transitory computer-readable media of claim 1, the operations further comprising:
obtaining, by the CRM system, a second set of opportunity-specific CRM data associated with a second sales opportunity;
generating, by the CRM system, a second set of one or more suggested sales actions applicable to the second set of opportunity-specific CRM data, at least by:
applying the machine learning model to the second set of opportunity-specific CRM data;
obtaining, from the machine learning model, a second set of one or more priority scores that are associated with respective suggested sales actions in the second set of one or more suggested sales actions;
presenting, in a graphical user interface (GUI) of the CRM system, the second set of one or more suggested sales actions, along with an indication of a second highest-ranked suggested sales action based on the second set of one or more priority scores;
receiving, via the GUI of the CRM system, second user input that indicates a second chosen sales action associated with the second set of opportunity-specific CRM data, wherein the second chosen sales action is not the second highest-ranked suggested sales action;
determining, by the CRM system, that a user who supplied the second user input does not have permission to perform sales actions that are not highest-ranked in the second set of one or more suggested sales actions;
responsive to determining that the user who supplied the second user input does not have permission to perform sales actions that are not highest-ranked in the second set of one or more suggested sales actions: prohibiting, by the CRM system, the user from performing the second chosen sales action.

* * * * *